---

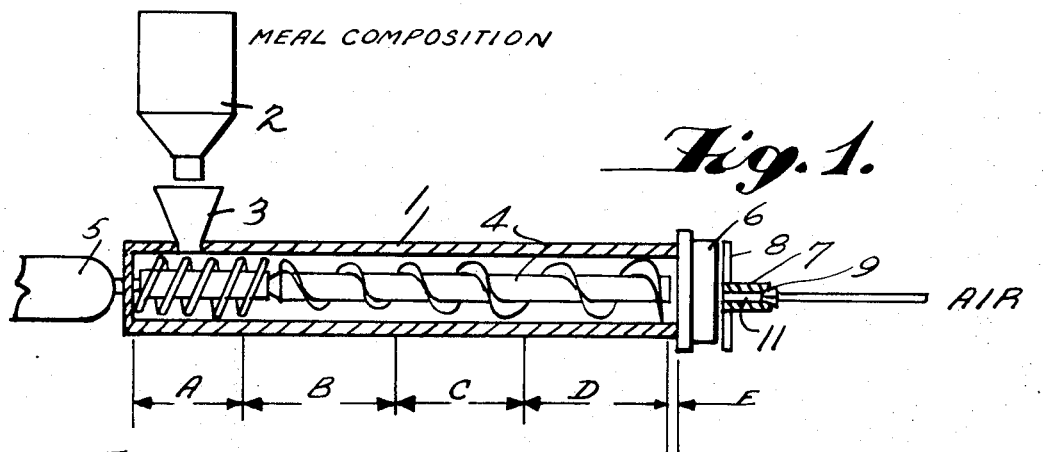
Fig. 1.
Fig. 2. PRIOR ART
Fig. 3.
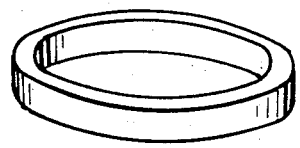
Fig. 6. Fig. 5.
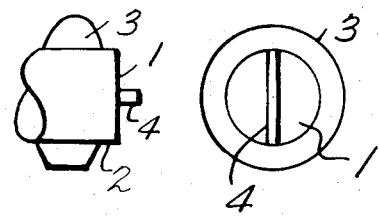
Fig. 4.
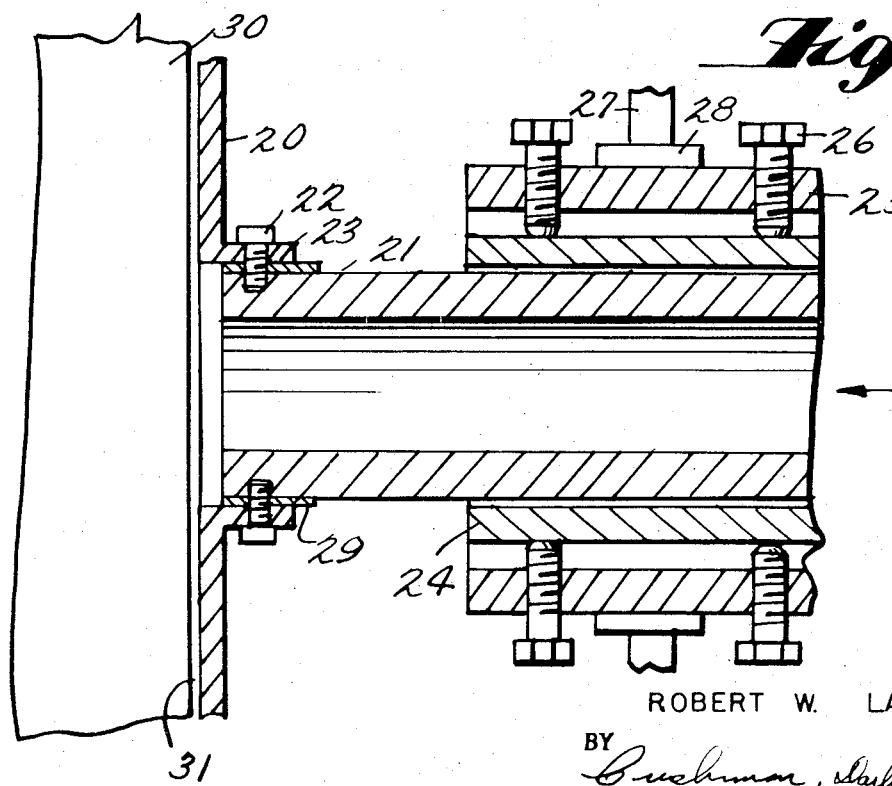
INVENTOR
ROBERT W. LaWARRE, SR.
BY
Cushman, Darby Cushman
ATTORNEYS

United States Patent Office 3,711,296
Patented Jan. 16, 1973

3,711,296
SNACK FOOD PRODUCTION
Robert W. La Warre, Sr., Lima, Ohio, assignor to
Beatrice Foods Co., Chicago, Ill.
Filed Nov. 24, 1969, Ser. No. 879,088
Int. Cl. A23l *1/10*
U.S. Cl. 99—80 R     8 Claims

ABSTRACT OF THE DISCLOSURE

A method and apparatus are disclosed for extruding a cereal composition into a shaped snack food. The particular cereal composition is liquified in the extruder and fully cooked in a short time. The extruded and chopped shape requires no further cooking and has a pleasing appearance and taste.

---

The present invention relates to the production of snack foods and more particularly to shaped snack foods having the flavor, background taste and appearance of the natural foods.

The shaping and flavoring of snack foods, made primarily from cereal meals, have become a great interest to the art due to the wide and growing acceptance of snack food by the consuming public. For example, snack foods having the general shape, appearance and flavor of onion rings, apple rings, orange rings, apple slices, orange slices, etc., are being accepted by the public. However, the products presently being produced lack the distinctive flavor, background taste and appearance of the natural products. Furthermore, presently available methods of producing these and other similar snack foods do not lend themselves to easy production and the apparatus used in these known methods is difficult and time-consuming to operate.

Generally speaking, the presently available snack foods are produced by heating and pressurizing a meal in an extruder until the meal reaches a plastic gel state, extruding the meal in the gel state, chopping the extruded shape to form rings, slices, etc., coloring, flavoring and subsequently cooking the colored and flavored shapes by baking, frying in fat, etc. until the shapes are palatable and the moisture content of the shapes is reduced to about 1 to 2% by weight. As is known in the art, the gel state is reached when the meal has become plastic by action of the starches in the meal being gelatinized. The numerous steps of the above process result in a snack food which is relatively expensive, of less than desirable flavor, background taste and shape. The apparatus for handling the shapes while in the tender gel state is difficult and time-consuming to operate and still results in many poorly formed or broken shapes.

Accordingly, it is an object of the present invention to provide a composition, method and apparatus which obviate these problems of the prior art and provide an improved shaped snack food. It is a further object of the invention to provide a composition, method and apparatus which are simple to operate, inexpensive in use and which yet provide a superior snack food from the standpoint of shape, flavor and background taste. Other objects will be apparent from the following disclosure and claims.

Briefly stated, the invention resides in the use of a special composition of cereal meals which may be heated and pressurized to a liquid state and accomplishes a complete cooking of the meal in the shaping process, with no subsequent cooking being required. The composition is cooked and shaped by a particular extrusion process and the shaping die and chopper are of a particular configuration for use with the process, which provides a uniformly shaped product.

Any cereal meal may be used with the present invention, e.g. corn, maze, rice, wheat, barley, soya flavor rye, etc., or mixtures thereof. Rice, maze and corn meal are preferred, and especially corn meal. As a striking difference from prior art compositions, little or no additional oil is added to the present composition. The natural oil of the cereal grain is generally quite sufficient, but up to 5% by weight, especially up to ½% by weight of an oil, may be used. The oil may be any vegetable oil and suitably vegetable oils are cotton seed oil, soya oil, coconut oil, peanut oil, safflower oil, corn oil, etc. The water content of the present composition is low as compared with prior art compositions. The water content on a bone dry basis should not be greater than 25% by weight of the meal. For many uses no water at all is added to the composition. Furthermore, the coloring and flavoring agents may be added prior to rather than after extrusion, with the present invention. Hence the composition comprises a cereal meal, up to 5% of a vegetable oil, up to 25% by weight of the meal of water, coloring and flavor agents. Of course, if desired, preservatives, etc., and salt may be added to the composition.

The flavoring agents may be as desired, e.g. onion oil, onion extract, onion powder, imitation onion flavoring, apple powder, apple oil, apple extract, concentrated orange juice, dried orange pulp and/or peel, orange peel oil, etc. Generally, flavoring agents are contained in the composition up to 5% by weight of the meal and as low as 0.01% by weight. However, greater or lesser amounts may be used if desired. The color agents may be any of the certified food grade color agents and are chosen strictly as desired. For example, about equal mixtures of Certified Food Coloring Yellow and Certified Food Coloring Brown, when used with corn meal in about 0.001 to 0.005% by weight gives an excellent color of batter dipped French-fried onion rings, when used in the present process. However, the particular flavoring agents and coloring agents and the amounts thereof may be used as desired to give any degree of flavor or color, to produce any particular colored and flavored snack food, as noted above.

Turning now to the extrusion process, the composition must have at least 5% of water therein, based on the bone dry meal. The amount of water may be contained in the meal itself as the natural water associated with the grain. The exact amount of water in the grain meal will vary depending on the particular grain, e.g. corn, rice, maze, the locality of growing of the grain, the growing conditions, etc. However, if an analysis shows less than 5% water in the meal additional water must be added to the meal prior to extrusion to result in a meal having at least 5% by weight of water. With additional amounts of water the degree of puffing or expansion of the extruded product increases and if a highly puffed product is desired additional water, up to 25% by weight of the meal, is added prior to extrusion. However, no more than 25% of water by weight of the meal may be added since above this upper limitation a rubbery, tough, poor textured extrudant which is difficult to chop is produced and results in an unacceptable product.

The particular extruding device is not critical but it must be capable of grinding the meal to a fine powder as is conventionally done in the prior art extrusion processes. The powder must then be subjected to elevated temperatures and pressures sufficient to cause the powdered meal to go to a gel state and subsequent temperatures and pressures must be sufficient to cause the gel state material to then go to a liquid state. Hence the screw or screws of the extruder must have, in order, a feeding section, a grinding section, a first compression section, a second compression section and a pumping section. In connection with the above it must clearly be understood that the terms "liquid state" mean that the flow conditions of the meal are those of a liquid, not a solid or a gel, as is well understood in the art. The first, and preferably the second, compression zones must also provide a gas relief mechanism or the screw must be designed to allow back venting of gases from the compression zones through the feed zone and to the atmosphere.

When the product passes into the liquid state, the time for cooking of the cereal becomes exceedingly short and herein lies an important discovery of the invention. Depending on the pressures utilized, the liquifying temperatures (and hence the cooking temperature) may be between about 200° F. to 450° F. and the cooking time will be between about 50 seconds and 1 second, especially between about 20 seconds and 5 seconds. For example, complete cooking will take place with corn meal in the liquid state and at a temperature of between 375° F. and 400° F. in less then 10 seconds. Since the exact cooking time and temperature are not narrowly critical, some overcooking and undercooking can be easily tolerated. However, for best results, the cooking time at any one temperature is slowly decreased (by increasing the throughput of the extruder) from about 50 seconds or more (60–80 seconds) until an optimum cooking time is obtained as determined by crispness, tenderness and taste of the extruded product, usually about 10 seconds or less.

The extruder die may be of any conventional design and is not critical. Of course, if an onion ring, for example, is to be made, the die must be capable of forming a tubular shape which may be chopped to form rings. The die temperature may be from about 300° F. to 450° F., e.g. 375° F. to 400° F. Above 450° F. burning will start to take place and temperatures in excess thereof should be avoided. A particularly good die for forming tubular products is described in copending application Ser. No. 822,135, filed May 6, 1969, entitled Tube Extruding Die, now U.S. Pat. 3,550,539, and the disclosure of that application is incorporated herein by reference.

However, the method and apparatus for chopping the extrudant is most important. The knife blades of the chopper must be quite hard and sharp and are suitably made of tool steel which has been heat treated to eliminate distortion in the blades when operating at elevated temperatures. The knife body for holding the blades should also be heat treated to eliminate temperature distortions. The blades must not cut with contact against the die face, as is common in the art, but must have a clearance between the die face. At operating temperatures, at least 10 mils clearance between the blades and die plate is required, with at least 30 mils clearance being preferred. The clearance may be as high as 100 mils, but a clearance of less than 60 mils is preferred. Preferably the knife body and knife blades are adjustable both with respect to the clearance between the knife blades and the die plate and with regard to the position of the knife body which should also be perpendicular to the center line of the die plate. With the above arrangement, the rings which are cut in any desired thickness and are quite regular in appearance, as opposed to the curled rings of the prior art and can be made to have the faint appearance of a batter tail, as is usually produced when French frying batter-dipped natural onion rings. Of course, the thickness of the chopped shapes depends on the rate of extrusion, the speed of rotation of the knife blades and the number of knife blades, as is quite well understood by the art.

The invention will be further disclosed and illustrated by the figures where:

FIG. 1 is an overall schematic view, partly in cross section, of a suitable device for the present process;

FIGS. 2 and 3 show the prior art and present shaped rings, respectively;

FIG. 4 is a schematic view, partly in cross section, of a suitable chopping knife assembly; and FIGS. 5 and 6 show an end and side view, respectively, of a schematic of the end of the extruder screw.

Turning now to FIG. 1, the figure represents in schematic form (partly in cross section) a conventional extruder barrel 1 (external heating means of conventional design not shown), having a feed hopper 2 for feeding the meal composition into extruder feeder 3 which empties into the extruder barrel 1 and in contact with screw 4 at the feeding section A of screw 4. The screw is turned by motor 5 which may be varied in r.p.m. and is suitably between a 5 and 25 HP motor, e.g. between 10 and 20 or 14 and 16 HP. The meal is ground to a powder by screw 4 in grinding section B, heated and pressurized to a gel state in plasticization section C and further heated and pressurized in liquification section D to provide a liquid meal composition. Section E of screw 4 is a pumping section and will be more fully explained below. Attached to the extruder discharge is a die plate 6 (which may be of conventional design). Adjacent the die plate is a knife body 7, having at least one but preferably a plurality of knives 8 adjustably attached thereto. The knife body 7 has a universal rotatable coupling 9 of conventional design mounted therein for connecting an air hose or like member to the knife body for passing air through bore 11 and blowing air on the die face of die plate 6. The knife body is rotatable in a conventional manner, e.g. connected to a motor of variable speed either directly or indirectly as by gears, belts, pullies, etc.

As noted above, the particular screw design is not critical so long as the particular screw or screws in combination provide the several zones discussed hereinbefore. Feeding section A is simply used to pick up a measured quantity of meal which quantity is proportioned depending upon the mass flow of plasticized and liquified meal passing through sections C and D. Likewise grinding section B is simply designed to grind the amount of meal fed by section A into a fine powder. However, section C must be capable of exerting sufficient pressure on the powdered meal at the operating temperatures, e.g. about 200° to about 450° F. to accomplish a plasticization of the powdered meal. Generally speaking, pressures of at least 4000 p.s.i.g. and especially between 5000 p.s.i.g. and 15,000 p.s.i.g. are necessary, such as between 8,000 p.s.i.g. and 10,000 p.s.i.g. Likewise section D must be capable of generating sufficient pressures at the operation temperature, e.g. about 200° F. to about 450° F., to liquify the meal. Generally pressures of at least 5,000 p.s.i.g. and especially between about 80,000 p.s.i.g., such as between about 20,000 p.s.i.g. and about 60,000 p.s.i.g. are required. The pressures of section E are similar. As can be appreciated, these are very high pressures and the evidence points to the fact that at these pressures, especially at the higher portion of the quoted ranges, the polysaccharides of the cereals fed into the extruder go through a chemical change and produce at least in part a product which is significantly different from the natural constituents of the cereal.

In connection with sections C and D, it will be appreciated that the energy input of the screw is converted, in part, to heat and, hence, increases the temperature of the meal in the extruder. Also the amount of energy absorbed by the meal and hence increase in temperature of the meal will increase as the meal passes through the extruder. Accordingly, for most applications it will not be necessary to add heat to the extruder by way of heating elements except during start up, especially when a screw or screws have been designed to perform this heating function.

The particular screw design to accomplish the above functions is not critical and may be as desired. Those skilled in the art may design a screw for any particular extruder according to the principles well known in the art. For such design principles of screws for accomplishing the present temperatures and pressure, see Plastic Engineering Handbook, SPE, 3 ed. Reinhold Pub. Corp., N.Y. (1960); 40 Modern Plastics 132 (January 1963); SPE J. 23, 53 (June 1967); SPE J. 20, 1183 (November 1964); and Modern Plastics Encyclopedia, 1969, pp. 672–684. In any respect, a conventional screw may normally be used, especially with corn meal, and includes the screw types as follows: (1) constant pitch, gradual transition metering screw; (2) gradual transition—50% metering screw; rapid transition—50% metering screw; varying pitch-flight mixing head screw; and two stage vented-screw. With conventional screws the necessary temperatures and pressures are automatically accomplished by increasing the r.p.m. of the screw and increasing the flow of grain thereto until liquification occurs in zone D.

No matter what type of screw is used it is important that the meal be vented in the plasticization and, preferably, in the liquification zones either by supplying a conventional venting mechanism therein or allowing a back flow and venting through the extruder feed. In this regard, sufficient venting is required so that during plasticization and liquification, the water vapor evolved is removed from the meal. If a venting is accomplished through the extruder feed, a maximum flow rate of meal through the extruder is preferred with good back mixing. Irrespective of the specific techniques used, the meal upon passing into the die must not contain more than 4% by weight of moisture, and most preferably below 3%, e.g. 1 to 2%. As will be appreciated by those skilled in the art this is a marked departure from the prior art, wherein the extrudant normally contains from 10% to 25% by weight of moisture and hence requires further cooking to produce a satisfactory snack food. This further cooking however is quite undesirable both from an economic and product point of view.

When further cooking is required, according to the prior art, a ring as shown in FIG. 2 results. It is no longer essentially round and essentially flat, as the present product, as shown in FIG. 3, but is deformed and curled. This deformed ring is due to the release of moisture from the ring and the resulting rearrangement of the meal in the ring during cooking. Also, when transferring the uncooked rings to a cooker, the fragile, uncooked rings tend to break and result in a large portion of unsightly product.

Turning to the knife assembly, FIG. 4 shows a plurality of knife blades 20 attached to knife body 21 by means of a screw 21 or like fastener, passing through leg 23 of knife 20 and into knife body 21. The knife body 21, which is hollow as described above, is mounted in a bearing 24 which is in turn mounted in a bearing holder 25. The bearing 24 is shown as a solid bearing such as an oil-impregnated sintered bearing, but obviously ball or needle or roller bearings could be used if desired. The bearing 24 is adjustable in bearing holder 25 by means of set screws 26, or like devices. The bearing holder is held to a rigid base by means of a rigid member 27, shown as a rod. The rod is connected to the bearing holder by any desired means 28, such as a plate welded thereto, but screws, bolts, etc., may be used. The rigid members are hinged (not shown) to the rigid base (not shown) in a conventional manner so that the knife assembly may be swung out of position for maintenance of the assembly and extruder. Knife blades 20 are adjustable by means of shims 29, or like devices, which shims may be tapered to incline the knives toward or away from the die plate 30 of the extruder. A running clearance between die plate 30 and knives 20 is maintained, as described above, and is shown at 31. A thrust bearing (not shown) of conventional design at the end of the knife body 21 opposite die plate 30 adjustably maintains the knife body 21 in bearing 24 and allows adjustment of clearance 31. The drive mechanism to turn the knife body is conventional and is not shown.

In regard to pumping section C of the extruder, a high pressure should be generated on the liquified meal to force it through the orifices of the die, such a pressure is conveniently accomplished by placing at least one vane on the end of the screw as shown in FIGS. 5 and 6. In these figures, on the end 1 of screw 2 having flights 3 is a vane 4 for pressurizing and pumping the liquified meal. Of course more than one vane may be used and the vanes may be curved if desired.

What is claimed is:

1. A process for producing a fully cooked shaped snack food comprising feeding a composition of cereal having at least 5% to 25% moisture through an extruder having therein a screw with respectively, in series, a feeding zone, a first compression zone, a second compression zone and a pumping zone, wherein the temperature and pressure in the first compression zone is maintained sufficiently great to plasticize the composition to the gel state and the temperature is at least 200° F. and the pressure is at least 4000 p.s.i.g. and up to 15,000 p.s.i.g., the temperature and pressure in the second compression zone are maintained sufficiently great to cause the said gel state composition to go to the liquid state and the temperature is at least 200° F. and the pressure is at least 5,000 p.s.i.g. and up to 80,000 p.s.i.g., expelling moisture from the composition in the compression zones until the moisture content of the liquified composition is no greater than 3% moisture by weight, holding the composition in the liquid state for a sufficient time to fully cook the composition, and extruding the cooked composition through a die maintained at a temperature of 300° to 400° F. attached to the extruder and chopping the extrudant to a desired thickness, whereby an extruded fully cooked snack food is produced.

2. The process of claim 1 wherein the cereal is corn meal and the die expresses a tubular shape which is chopped to form a substantially flat ring.

3. The process of claim 2 wherein the chopping of the shape is accomplished by revolving at least one knife blade in a plane substantially perpendicular to the center line of the die and wherein the said blade does not contact the die.

4. The process of claim 3 wherein the plane of rotation of the said knife blade is maintained in a position from the die of between 10 mils and 100 mils.

5. The process of claim 1 wherein the time of cooking of the liquified meal is less than 80 seconds.

6. The process of claim 5 wherein the temperature in the said compression zones is between 200° F. and 450° F.

7. The process of claim 6 wherein at least a part of the moisture is expelled by passing the moisture back through the extruder and out the feed of the extruder.

8. The process of claim 7 wherein the pumping of the liquified and cooked composition is accomplished by means of a vane attached to the exit of the screw in the extruder.

References Cited
UNITED STATES PATENTS

| | | | |
|---|---|---|---|
| 3,104,975 | 9/1963 | Bowman | 99—81 |
| 3,458,321 | 7/1969 | Reinhart et al. | 99—80 |
| 3,462,277 | 8/1969 | Reinhart | 99—81 |
| 3,540,890 | 11/1970 | Benson | 99—83 |
| 3,482,992 | 12/1969 | Benson | 99—81 |
| 3,246,990 | 4/1966 | Thompson et al. | 99—82 |
| 3,117,006 | 1/1964 | Wenger | 99—80 |
| 2,842,072 | 7/1958 | Graves | 99—81 X |
| 1,924,826 | 8/1933 | Anderson | 99—82 |

RAYMOND N. JONES, Primary Examiner

U.S. Cl. X.R.

99—81, 83; 146—113